(12) United States Patent
Johns

(10) Patent No.: US 11,386,214 B2
(45) Date of Patent: *Jul. 12, 2022

(54) WEB APPLICATION EXECUTION WITH SECURE ELEMENT EXTENSION

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 759 days.

This patent is subject to a terminal disclaimer.

(21) Appl. No.: 16/218,781

(22) Filed: Dec. 13, 2018

(65) Prior Publication Data

US 2020/0193042 A1    Jun. 18, 2020

(51) Int. Cl.
| | |
|---|---|
| *G06F 21/62* | (2013.01) |
| *H04L 67/01* | (2022.01) |
| *H04L 9/40* | (2022.01) |
| *G06F 16/958* | (2019.01) |
| *G06F 21/60* | (2013.01) |
| *H04L 9/08* | (2006.01) |

(Continued)

(52) U.S. Cl.
CPC ........ *G06F 21/6209* (2013.01); *G06F 16/986* (2019.01); *G06F 21/128* (2013.01); *G06F 21/602* (2013.01); *H04L 9/0894* (2013.01); *H04L 63/0471* (2013.01); *H04L 67/42* (2013.01); *G06F 9/541* (2013.01)

(58) Field of Classification Search
CPC .. G06F 21/6209; G06F 16/986; G06F 21/128; G06F 21/602; G06F 9/541; G06F 21/6245; H04L 9/0894; H04L 63/0471; H04L 67/42; H04L 63/0428

See application file for complete search history.

(56) References Cited

U.S. PATENT DOCUMENTS

| | | | |
|---|---|---|---|
| 2006/0200665 A1* | 9/2006 | Olson | H04L 63/102 713/167 |
| 2009/0187820 A1* | 7/2009 | Stinson | G06Q 30/06 715/238 |

(Continued)

OTHER PUBLICATIONS

"W3C. Content Security Policy Level 3", W3C First Public Working Draft, Jan. 26, 2016, [Online]. Retrieved from the Internet: <URL: https://www.w3.org/TR/2016/WD-CSP3-20160126/>(Jan. 26, 2016), 52 pgs.

(Continued)

*Primary Examiner* — Sher A Khan
(74) *Attorney, Agent, or Firm* — Schwegman Lundberg & Woessner, P.A.

(57) ABSTRACT

Various examples are directed to systems and methods for executing a web application with client-side encryption. A web browser can receive a document comprising a plurality of data elements including a secure element that comprises an encrypted value. An extension component may generate a secure container element to replace the secure element. The extension component can also insert a subdocument into the secure container element. The web browser may be configured to prevent web applications from accessing the subdocument. The extension component may also decrypt the encrypted value to generate a clear value and write the clear value to the subdocument. The web browser may render the document using the clear value.

20 Claims, 12 Drawing Sheets

(51) Int. Cl.
   *G06F 21/12*   (2013.01)
   *G06F 9/54*   (2006.01)

(56) References Cited

U.S. PATENT DOCUMENTS

| | | | | |
|---|---|---|---|---|
| 2010/0023751 | A1* | 1/2010 | He | H04L 63/0428 713/150 |
| 2011/0016169 | A1* | 1/2011 | Cahill | G06F 40/143 709/203 |
| 2014/0007182 | A1* | 1/2014 | Qureshi | H04L 63/20 726/1 |
| 2014/0075555 | A1* | 3/2014 | Shilimkar | G06F 21/56 726/23 |
| 2014/0304816 | A1* | 10/2014 | Klein | G06F 21/56 726/23 |
| 2017/0195363 | A1* | 7/2017 | Dahan | H04L 63/104 |
| 2017/0279823 | A1* | 9/2017 | Lin | H04L 63/0236 |
| 2017/0295144 | A1* | 10/2017 | Song | H04L 9/0861 |
| 2017/0346830 | A1* | 11/2017 | Goldfarb | H04L 63/102 |
| 2018/0255068 | A1* | 9/2018 | Figueroa | H04L 63/0442 |

OTHER PUBLICATIONS

Agrawal, Rakesh, et al.,, "Order preserving encryption for numeric data. In Proceedings of the 2004 ACM SIGMOD International Conference on Management of Data", SIG-MOD, (2004), 563-574.

Chen, Eric, et al., "Self-Exfiltration: The Dangers of Browser-Enforced Information Flow Control", W2SP, (2012), 8 pgs.

Diallo, Mamadou, et al., "CloudProtect: Managing Data Privacy in Cloud Applications", IEEE Fifth International Conference on Cloud Computing, (Jun. 2012), 303-310.

Fuhry, Benny, et al., "Encrypting Analytical Web Applications", In Proceedings of the 2016 ACM on Cloud Computing Security Workshop, (2016), 35-46.

Gentry, Craig, "Fully Homomorphic Encryption Using Ideal Lattices", In Proceedings of Forty-First Annual ACM Symposium on Theory of Computing, (May 31, 2009), 169-178.

He, Warren, et al., "ShadowCrypt: Encrypted Web Applications for Everyone", ACM SIGSAC Conference on Computerand Communications Security, (2014), 1028-1039.

Hickson, Ian, "The Web Sockets API W3C Working Draft", W3C, [Online], Retrieved from the Internet: <URL: http://www.w3.org/TR/2009/WD-websockets-20091222/>, (Dec. 22, 2009), 10 pgs.

Popa, Raluca, et al., "Cryptdb: Protecting Confidentiality with Encrypted Query Processing", Proceedings of the 23rd ACM Symposium on Operating Systems Principles, (2011), 16 pgs.

Ruderman, Jesse, "The Same Origin Policy", Mozilla.org, [Online], Retrieved from the Internet: <URL: http://www.mozilla.org/projects/security/components/same-origin.html>, (Aug. 24, 2001), 2 pgs.

Russell, Alex, et al., "Service Workers. W3C Working Draft", W3C, [Online], Retrieved from the Internet: <URL: https://www.w3.org/TR/2017/WD-service-workers-1-20171102/>. (Nov. 2, 2017), 66 pgs.

Saleh, Eyad, et al., "HPISecure Toward Data Confidentiality in Cloud Applications", 13th IEEE/ACM International Symposium on Cluster, Cloud, and Grid Computing., (May 2013), 605-609.

Shepherd, Eric, "Window.postMessage", MDN Web Docs Mozilla, [Online], Retrieved from the Internet: <URL: https://developer.moziila.org/en-US/docs/Web/API/Window/postMessage>, (Accessed Feb. 4, 22), 7 pgs.

Van Acker, Steven, et al., "Data Exfiltration in the Face of CSP", Proceedings of the 11th ACM on Asia Conference on Computer and Communications Security, (2016), 853-864.

Van Goethem, Tom, et al., "Request and Conquer: Exposing Cross-Origin Resource Size,", 25th USENIX Security Symposium, (2016), 16 pgs.

Van Goethem, Tom, et al., "The Clock is Still Ticking: Timing Attacks in the Modern Web", Proceedings of the 22nd ACM SIGSAC Conference on Computer and Communications Security, (2015), 1382-1393.

Van Kesteren, Anne, "The XMLHttpRequest Object. W3C Working Draft,", W3C, [Online]. Retrieved from the Internet: <URL: https://www.w3.org/TR/2008/WD-XMLHttpRequest-20080415/>, (Apr. 15, 2008), 14 pgs.

Xiaodong, Dawn, et al., "Practical Techniques for Searches on Encrypted Data", In Proceeding 2000 IEEE Symposium on Security and Privacy, (2000), 44-55.

\* cited by examiner

WEB APPLICATION EXECUTION WITH SECURE ELEMENT EXTENSION

TECHNICAL FIELD

This document generally relates to methods and systems for use with computer devices, including networked computing devices. More particularly, this document relates to systems and methods for secure execution of web applications in a web browser.

BACKGROUND

A web browser executes at a client computing device and can render documents and executing web applications. Documents include data that can be presented at a web browser user interface and/or received through the web browser user interface. Web applications include scripts or other code that execute in the web browser to perform various tasks for the user.

BRIEF DESCRIPTION OF DRAWINGS

The present disclosure is illustrated by way of example, and not limitation, in the following figures.

DETAILED DESCRIPTION

Figure 1:
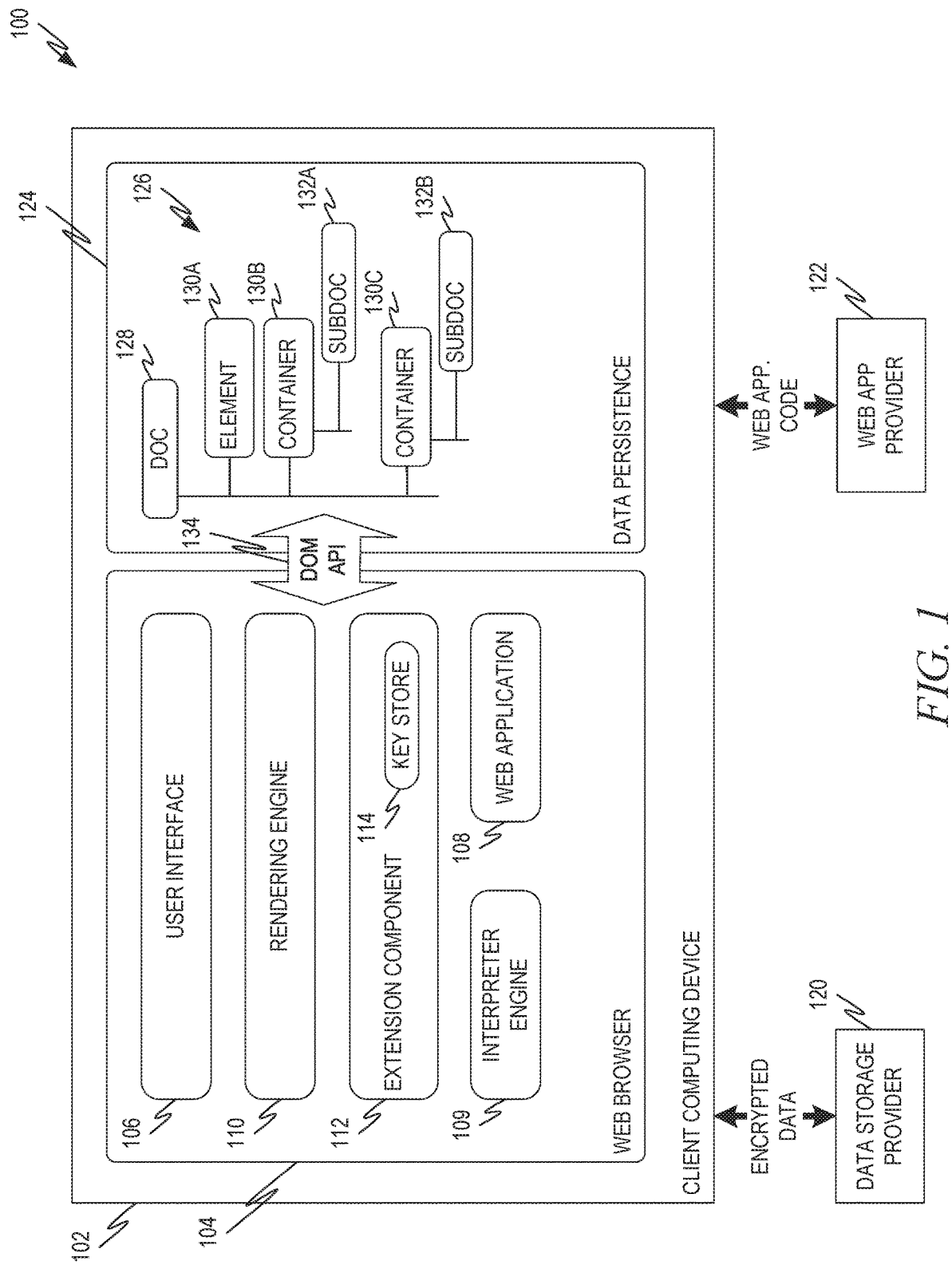
FIG. 1 is a diagram showing one example of an environment for web application execution with secure data elements.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

A client computing device executes a web browser that supports the execution of web applications. Web applications are executed from web application code that is received by the web browser, for example, from a web application provider according to a Software as a Service (SaaS) model. The web application code can be received independently and/or as part of a document (e.g., a Hypertext Markup Language (HTML) or eXtensible Markup Language (XML) document). In some examples, the web application code is a script, such as JavaScript, that is executed by an interpreter engine of the web browser.

The web application can provide a user interface (UI) by downloading and/or generating HTML, XML or other suitable documents that are rendered by a rendering engine of the web browser. Documents can include elements for storing data and/or describing the way that the document should be rendered by the rendering engine. Document elements can include display elements and input elements. A display element includes data that is to be displayed by the web browser, for example, at the web browser's main viewing panel. An input element can be associated with a UI form for receiving data from a user of the client computing device. For example, an input element can describe an input field to be displayed at the web browser's main viewing panel to receive a data value from the user. Various elements of a document can be represented at the web browser according to a Document Object Model (DOM).

In some examples, it is desirable to execute a web application utilizing a remote data storage provider, for example, according to an Infrastructure as a Service (IaaS) arrangement. The web application and web browser can utilize the data storage provider by transmitting data to the data storage provider and then querying the data storage provider to retrieve the data when desired.

Utilizing a remote data storage provider can create issues related to data security. To address these, various examples utilize client-side encryption. For example, the web browser can encrypt data before the data is sent to the data storage provider. The data can be stored at the data storage provider in an encrypted format. When encrypted data is retrieved from the data storage provider, the web browser can decrypt the data before use.

Client-side encryption provides data security relative to the data storage provider but may not protect data relative to web applications executing in the web browser. For example, web applications executing in the web browser may have access to the DOM associated with a document. Accordingly, even if client-side encryption is used, web applications can access clear values on the client-side. Recall that web application code is often received from the third-party web application provider and, therefore, not secure. If a web application includes malicious code, the web application may be able to defeat client-side encryption by accessing and leaking clear data. In some arrangements, a malicious web application may even be able to query the data storage provider for additional sensitive data and access the clear client-side values after decryption.

Various examples described herein address these and other issues by implementing a web browser with secure elements for data. Secure elements can be implemented by an extension component in the web browser. Many web browsers support extension components and allow the extension components to execute with different (e.g., higher) privileges than web applications. Accordingly, the extension component can be configured, as described herein, to handle sensitive clear data in a way that is transparent and inaccessible to web applications and other potentially insecure sources.

Documents received by the web browser from an insecure source, such as a web application or web server, include encrypted data stored in secure elements. The secure elements can include the encrypted data and, in some examples, data describing the encryption of the data such as, for example, a key identifier (ID) indicating a cryptographic key at the extension element and/or an algorithm attribute indicating a cryptographic algorithm for encrypting or decrypting the data.

The extension component intercepts documents directed to the web browser and manages client-side encryption and/or decryption. The extension component replaces and/or reconfigures secure elements of the document with secure container elements. The extension component generates a subdocument, such as a Hyptertext Markup Language (HTML) iframe, and inserts the subdocument in or under the container document in the document's DOM. The extension component also decrypts the encrypted value to generate a clear value and writes the clear value to the subdocument. Privileges to access and/or modify the subdocument may be provided to the extension component as well as other components of the web browser, such as the rendering engine. On the other hand, web applications may not be provided with privileges to access the subdocument and the clear data stored therein.

In some examples, the extension component configures the DOM application programming interface (API) to affect the behavior of the secure container element and subdocument. For example, when a web application queries a value of the secure container element, the DOM API may be configured to return the encrypted value. Also, for example, when a web application modifies the value of the secure container element by writing a new encrypted, the DOM API and/or subdocument can be configured to call the extension component to decrypt the new encrypted value to generate a new clear value and to store the new clear value in the subdocument.

FIG. 1 is a diagram showing one example of an environment 100 for secure web application execution with secure elements. The environment 100 includes the client computing device 102, which is in communication with a data storage provider 120 and a web application provider 122. The client computing device 102 may be or include any suitable computing device, such as, for example, a desktop computer, a laptop computer, a tablet computer, a mobile phone or similar devices, etc. The client computing device 102 executes a web browser 104, described in more detail below.

The web application provider 122 can similarly include one or more computing devices and may be accessible to the client computing device 102 via a network such as, for example, the Internet. The web application provider 122 can provide web application code to the client computing device, for example, as described herein. In some examples, the web application code is or includes an interpreted script such as, for example, JavaScript.

The data storage provider 120 may include any suitable computing device or devices and may be accessible to the client computing device 102 via a network such as, for example, the Internet. The data storage provider 120 can also include one or more data storage devices for storing data, as described herein. The data storage provider 120 can exchange encrypted values with the client computing device, for example, as described herein. Examples of hardware and software arrangements for computing devices that may make up all or part of the client computing device 102, data storage provider 120 and/or web application provider 122 are provided herein with reference to FIGS. 9 and 10.

The client computing device 102 executes a web browser 104. The web browser 104 may be or include any suitable web browser including, for example, the Chronic® browser available from Google Inc., the Firefox® browser available from Mozilla Foundation, the Safari® browser available from Apple Inc., the Internet Explorer® browser available from Microsoft Corporation, the Microsoft Edge® browser available from Microsoft Corporation. The web browser 104 includes a web browser UI 106, a rendering engine 110, an extension component 112 and an interpreter engine 109. The rendering engine 110 renders documents that can, for example, by received from an external server (e.g., the web application provider 122) and/or generated by a web application 108. For example, the rendering engine 110 may convert documents (e.g., HTML or XML documents) into commands that cause the appropriate text, sounds, and/or images to be provided to displays, speakers, touch pads, or other input/output (I/O) devices of the client computing device. (See FIGS. 10-11). The interpreter engine 109 interprets web application code (e.g., scripts) to execute one or more web applications, such as the web application 108. For example, the interpreter engine 109 may be arranged to interpret JavaScript or other interpreted script code.

The web application 108 may manage the display of web content, interactions with a user, and/or other aspects of web content displayed through the web browser 104. For example, the web application 108 can provide a web application VI via the web browser UI 106. The web application 108, in some examples, includes script code received from the web application provider 122. Also, in some examples, the web application 108 calls for the execution of other scripts at the web browser 104. In some examples, the web application 108 generates or modifies dynamic scripts to be executed at the web browser 104 as a user of the client computing device 102 interacts with web content rendered at the web browser 104.

The user of the client computing device 102 accesses the web application 108 by launching the web browser 104 and selecting a Universal Resource Locator (URL) or other address associated with the web application provider 122. The address may be referred to as a web origin. The web browser 104 sends to the web application provider 122 a request for the web application 108. For example, the request may be directed to the web origin associated with the web application provider 122. The web browser 104 receives, from the web application provider 122, a response message including the requested web application code for the web application 108. The rendering engine 110 and/or interpreter engine 109 is used to execute the web application 108 and render a web application UI through the browser web browser UT 106. Additional requests and replies may be exchanged between the client computing device 102 and the web application provider 122, for example, as a user of the client computing device 102 interacts with the web application. Requests and responses between the client computing device 102 and the web application provider 122 can be arranged according to the Hypertext Transfer Protocol (HTTP) syntax.

When rendered, the web application UI can provide various types of functionality to a user of the client computing device 102. For example, web content may provide textual, audio, or video content describing current events, sports, cultural, or other content. In some examples, the web content also provides functionality to the user. For example, the web application 108 can provide the user with functionality for executing financial transactions, making electronic purchases, accessing secure business applications, etc.

The web browser 104 also includes an extension component 112. The extension component 112 can be configured according to a general and/or browser-specific standard for extensions. The web browser 104 can be configured to execute the extension component 112 at a higher privilege level than web applications such as the web application 108. The web browser 104 can be configured to maintain isolation between the extension component 112 and the web application 108. This can allow the extension component 112 to securely implement client-side encryption, as described herein.

The extension component 112 is configured to encrypt and decrypt data values associated with secure data elements. The extension component 112 can encrypt and/or decrypt data values using any suitable algorithm or method, in some examples, the extension component 112 utilizes one or more encryption algorithms that permit processing of the encrypted values. For example, the encryption tool may be configured to perform a partially or fully homomorphic encryption algorithm, an order preserving encryption algorithm, a searchable encryption algorithm, etc.

The extension component 112 can include or have access to a key store 114. The key store 114 includes one or more cryptographic keys that can be used to encrypt or decrypt data values as described herein. The key store 114 can be stored, for example, at a secure memory location at the client computing device 102, such as at the data persistence 124 described herein. The secure memory location is accessible to the extension component 112 and/or the web browser 104 but not to other components, such as the web application 108.

The client computing device also comprises data persistence 124 of the web browser. The data persistence 124 is data storage location or set of data storage locations of the client computing device 102 that are assigned to the web browser 104. The data persistence 124 can include memory locations (e.g., main memory 1104 of FIG. 11) and/or storage device locations e.g., storage device 1116 of FIG. 11).

The web browser 104 can use the data persistence 124 to store one or more DOMs, such as the DOM 126. The DOM 126 is a representation of a document 128. The web browser 104 can receive the document 128 from the web application 108 and/or from a remote web server, such as the web application provider 122. For example, the web application 108 can generate one or more documents that are rendered by the rendering engine 110 for display at the web browser UI 106. Also, in some examples, a document can represent a web page loaded by the web browser 104 from a web server. The document can be in any suitable format including, for example, HTML, XML, etc. The DOM 126 can be generated by the web browser 104 (e.g., by the extension component 112, rendering engine 110, etc.) as described herein.

The extension component 112 can be configured to intercept documents received by the web browser 104, for example, from the web application 108 and/or from another source such as the web application provider 122 or other web server. Upon intercepting the document 128, the extension component 112 identifies secure elements (if any) in the document. In the example of FIG. 1, the document 128 includes an element 130A that is not secure. The extension component 112 may not affect this element 130A.

If a secure element is present, the extension component 112 replaces the secure element with a secure container element, such as example secure container elements 130B and 130C. The extension component 112 can also add subdocuments 132A, 132B to respective secure container elements 130B, 130C. Subdocuments 132A, 132B can be, for example, HTML iframe or another suitable construct. Subdocuments 132A, 132B can be configured to be hosted at a non-web origin (e.g., the secure container elements 130B, 130C).

If a secure element includes an encrypted value, the extension component 112 decrypts the encrypted value. In some examples, the decryption is performed using a cryptographic key from the key store 114 indicated by a key ID of the secure element and using a cryptographic algorithm indicated by an algorithm attribute of the secure element. If no key ID and/or algorithm attributes is included in the secure element, then a default cryptographic key and/or cryptographic algorithm can be used. Any suitable cryptographic algorithm can be used. In some examples, a symmetric algorithm such as, for example a Data. Encryption Standard (DES) algorithm, an Advanced Encryption Standard (AES) algorithm, etc. Decrypting the encrypted value yields a clear value.

The extension component 112 writes the clear value to the subdocument 132A, 132B. In some examples, the extension component 112 also writes the encrypted value to the secure container element 130B, 130C. For example, the extension component 112 can be configured to write the encrypted value to a property of the secure container element 130B, 130C. In this way, the encrypted value can be used in read, write, and/or update operations as described herein.

The extension component 114 can also include API logic at the subdocument 132A, 132B. The API logic can instruct a DOM API 134 to manage interactions between the secure container elements 130B, 130C and components of the web browser such as web applications 108, the rendering engine 110, etc.

The API logic can include logic that instructs the DOM API 134 to handle read requests directed to the secure container element 130B, 130C. For example, the web application 108 may request to read the secure container elements 130B, 130C just as it would request to read other elements 130A of the document 128. In some examples, when the web application 108 requests to read a non-secure element, such as the element 130A, the DOM API 134 returns the value associated with the element 130A. When the requested element is a secure container element 130B, 130C, however, the requested value is sensitive. API logic at the subdocument 132A, 132B can instruct the DOM API 134 to respond to the web application 108 read request by providing the encrypted value stored at the secure container element property.

In another example, a web application 108 can request to write a new encrypted value to a secure container element 130B, 130C. The API logic at the subdocument can instruct the DOM API 134 to write the new value to the property of the secure container element 130B, 130C. The subdocument 132A, 132B can also include an instruction to call the extension component 112 to decrypt the new encrypted value and write the resulting clear value to the subdocument 132A, 132B.

In some examples, the secure container element 130B, 130C can be configured to receive clear input from a user of the client computing device. The user provides a clear value through the web browser UI 106 into the subdocument 132A, 132B. The subdocument 132A, 132B can, for example, include functionality that sends a message to the extension component 112 indicating that a new clear value has been received. The extension component 112 can respond by encrypting the new clear value to generate a new encrypted value. The new encrypted value can be written to the property of the secure container element 130B, 130C.

Figure 2:
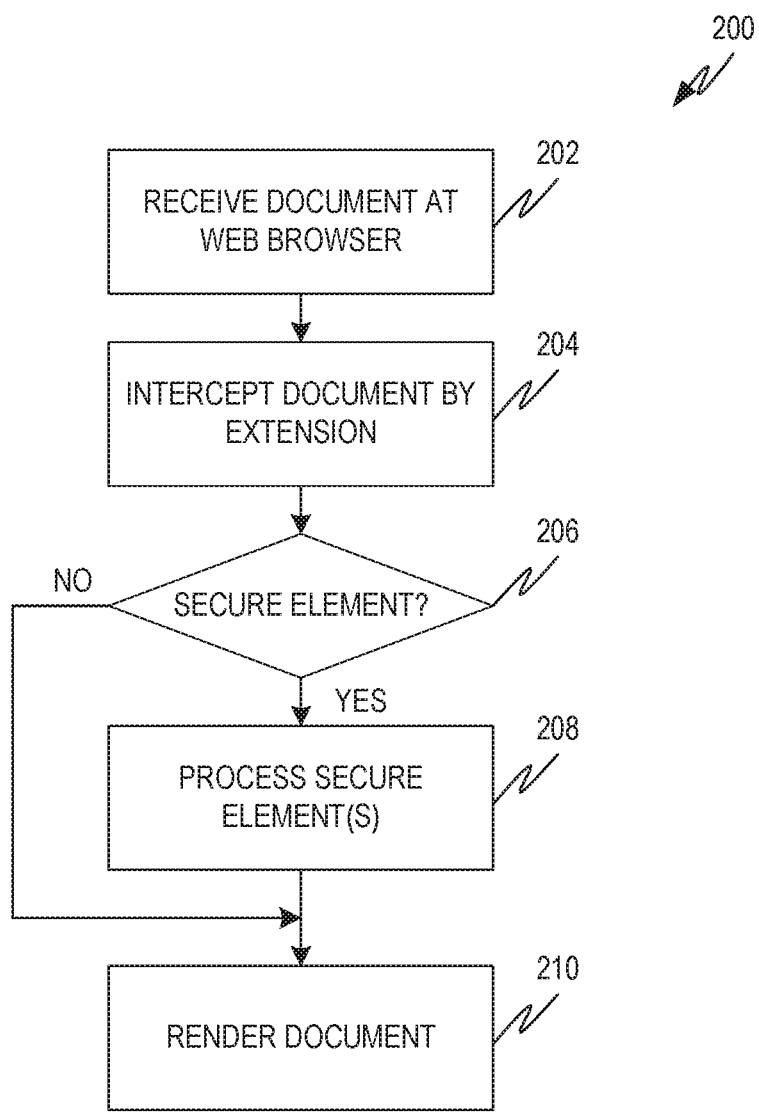
FIG. 2 is a flowchart showing one example of a process flow that can be executed at the web browser to render a document that may include a secure element.

FIG. 2 is a flowchart showing one example of a process flow 200 that can be executed at the web browser 104 to render a document that may include a secure element. At operation 202, a document is received at the web browser 104. The document can be received from a remote source, such as for example, the web application provider 122 and/or a web server. Also, in some examples, the document is generated by the web application 108, for example, as all or part of a web application UI.

At operation 204, the extension component 112 intercepts the document. The extension component 112 can intercept the document in various ways. In some examples, document is received as part of a Hypertext Transfer Protocol (HTTP) message. The web browser 104 may be configured to permit extensions, such as the extension component 112, to manipulate HTTP traffic. Accordingly, the extension component 112 can be configured to intercept each document received via an HTTP message. In other examples, the web browser 104 may not permit extensions to manipulate HTTP traffic. In one such example, the extension component can be configured to launch one or more service workers at the web browser 104. The service workers can detect incoming HTTP messages that include a document and prompt the extension component to process those documents.

Referring again to FIG. 2, at operation 206, the extension component 112 determines if there are any secure elements in the document. In some examples, the extension component 112 determines whether there are any secure elements in the document by referring to the name and/or header data for the elements. In some examples, secure element names, indicated at the element header, can be modifications of other (non-secure) elements in the syntax of the document. For example, a secure data element corresponding to the HTML heading level element <H1> may be called <CtyptoH1> or <SecureH1>.

If there are no secure elements in the document, then the document is forwarded to the rendering engine 110 for rendering at operation 210. If the document includes one or more secure elements, the extension component 112 processes the secure elements. For example, the extension component can replace the secure elements with secure container elements, add subdocuments to the secure container elements, and configure the DOM API logic, as described herein. The document, now with the secure container elements in place of the original secure elements, can then be rendered at operation 210.

Figure 3:
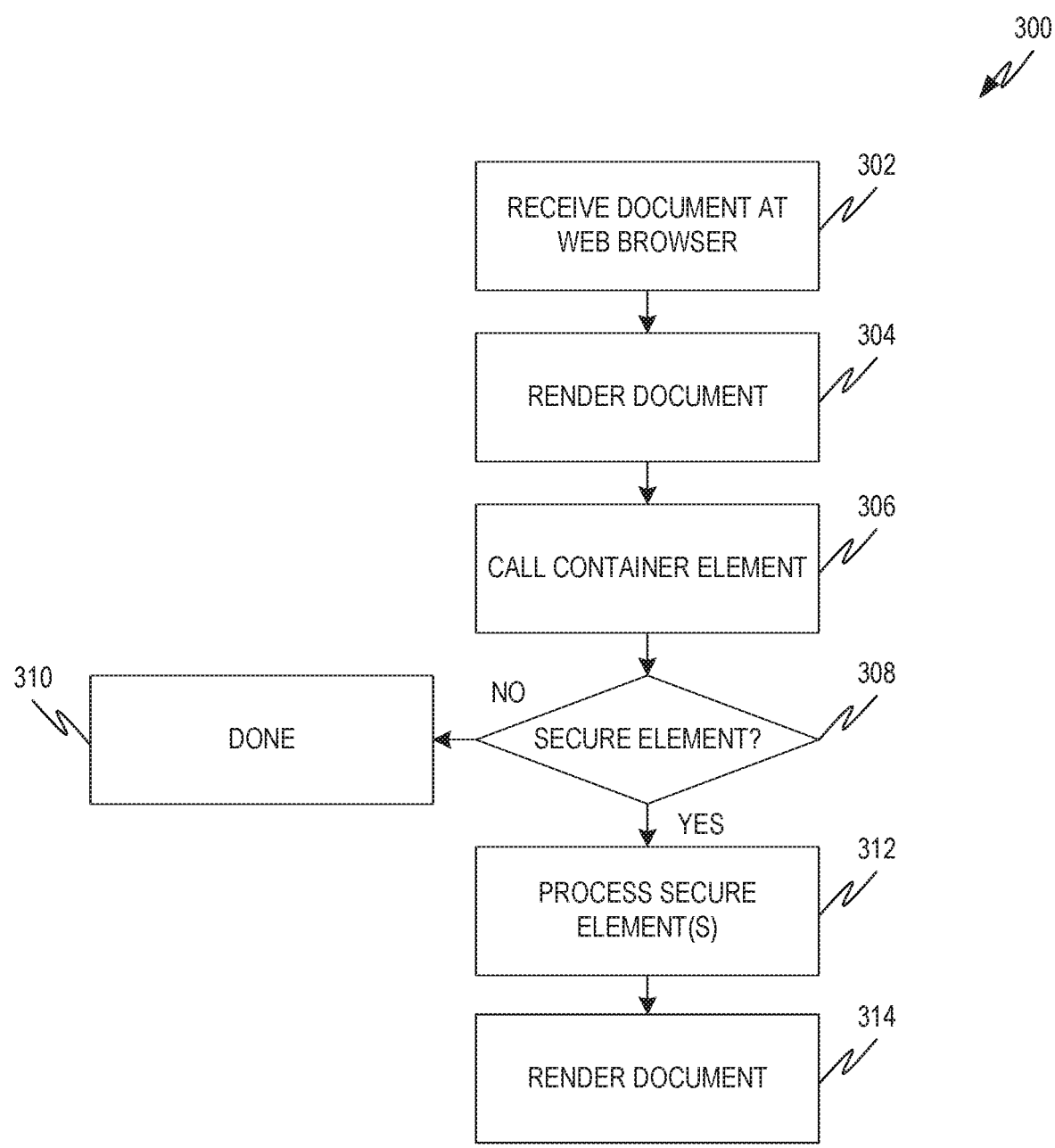
FIG. 3 is a flowchart showing another example of a process flow that can be executed by a web browser to render a document that may include a secure element.

FIG. 3 is a flowchart showing another example of a process flow 300 that can be executed by a web browser to render a document that may include a secure element. In the example of FIG. 3, the extension component 112 may not intercept the document prior to rendering but, instead, make modifications after the document is initially rendered.

At operation 302 a document is received at the web browser 104. The document can be received from a remote source, such as for example, the web application provider 122 and/or a web server. Also, in some examples, the document is generated by the web application 108, for example, as all or part of a web application UI.

At operation 304, the rendering engine 110 renders the document. Any secure elements in the document may not be formatted in a manner recognized by the rendering engine 110. Accordingly, if any secure elements are included in the documents, the rendering engine 110 may ignore them in the rendering at operation 304.

At operation 306, the web browser 104 calls the extension component to process the now-rendered document. The extension component 112 determines at operation 308 whether the document includes any secure elements. If the document does not include any secure elements, the process flow 300 may be complete at operation 310, with the original rendering at operation 304 maintained. On the other hand, if there are any secure elements in the document, the extension component 112 can process those secure elements at operation 312. After secure elements are processed, the document can be re-rendered at operation 314.

Figure 4:
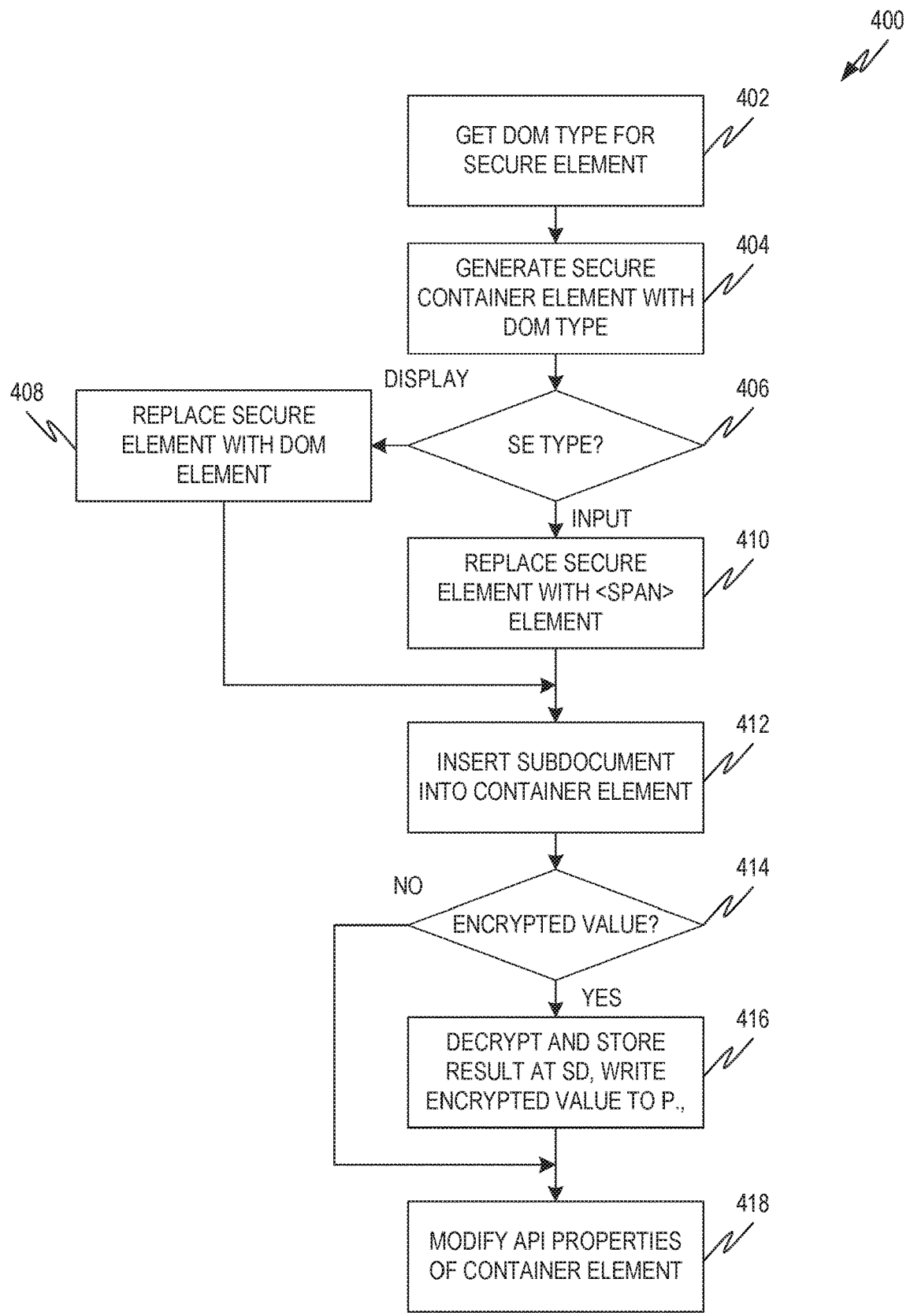
FIG. 4 is a flowchart showing one example of a process flow that can be executed by the extension component to process a secure element in a document.

FIG. 4 is a flowchart showing one example of a process flow 400 that can be executed by the extension component 112 to process a secure element in a document. For example, the process flow shows one example way that the extension component 112 can perform all or part of the operation 208 of the process flow 200 and/or the operation 312 of the process flow 300. The process flow 400 of FIG. 4 shows processing for a single secure element. Accordingly, if a document includes more than one secure element, the process flow 400 can be performed for each secure element.

At operation 402, the extension component 112 gets a DOM element type corresponding to the secure element. In some examples, the secure element corresponds to a non-secure element supported by the syntax of the document. TABLE 1 below includes example HTML elements and corresponding secure data elements. In the example of TABLE 1, secure elements are indicated by adding the prefix "Crypto" to their titles. The examples of TABLE 1 are not intended to provide an exhaustive list of potential secure elements but are instead intended only to provide examples. In this example, the DOM element type of a secure element is the corresponding HTML element.

TABLE 1

| HTML Element | Secure Element | Element Type |
|---|---|---|
| <H1> - <H6> | <CryptoH1> - <CryptoH6> | Display Element |
| <DIV> | <CryptoDIV> | Display Element |
| <LI> | <CryptoLI> | Display Element |
| <P> | <CryptoP> | Display Element |
| <SPAN> | <CryptoSPAN> | Display Element |
| <A> | <CryptoA> | Display Element |
| <TH | <CryptoTH> | Display Element |
| <TD> | <CryptoTD> | Display Element |
| <INPUT> | <CryptoINPUT> | Input Element |
| <OUTPUT> | <CryptoOUTPUT> | Input Element |
| <TEXTAREA> | <CryptoTEXTAREA> | Input Element |

At operation 406, the extension component 112 generates a secure container element for the secure element. The secure container element can be of the DOM element type determined at operation 402. At operation 404, the extension component 112 determines whether the secure element is a display element or an input element. This may be indicated, for example, by the DOM element type determined at operation 402.

If the secure element is a display element, the extension component 112, at operation 408, replaces the secure element in the document with the secure container generated at operation 404. Listing 1 below shows an example DIV secure element and a corresponding secure container element:

Listing 1:

| | |
|---|---|
| 1 | <CryptoDIV ID="CM1" CMKeyID="911" CMAIgID="Deterministic"> |
| 2 | AB34CEA23... |
| 3 | </CryptoDIV> |
| 4 | |
| 5 | <DIV rel-crypto="cryptodiv" ID="CM1" CMKeyID="911" CMAIgID= |
| 6 | "Deterministic"> |
| 7 | AB34CEA23... |
| 8 | </DIV> |

In the example of Listing 1, the example secure element is shown at lines 1-3 and is called "CM1." The secure element includes a header indicating an element type, "CryptoDIV"—indicating a secure version of a DIV HTML document. The secure element also includes a key ID ("911"), an algorithm attribute ("Deterministic") and an encrypted value ("AB34CEA23 . . . "). The secure container, shown at lines 5-8 in this example, is of the DOM element type corresponding to the secure element, in this example, an HTML DIV element. The secure container element, shown at lines 5-8 in this example, is also called "CM1." It includes the key ID and algorithm attribute from the secure container as well as the encrypted value. The secure container element also includes an indicator that it is a secure container, which in this example is a tag ("rel-crypto='cryptodiv'").

If the secure element is an input-type element, then the extension component 112, at operation 410, replaces the secure element with a secure container element that can be configured, for example, by cascading style sheets (CSS) properties of the element, to have dimensions matching the dimensions of the replaced secure element. In some examples, input-type elements are replaced with secure container elements that are HTML <SPAN> elements.

At operation 412, the extension component 112 inserts a subdocument into the secure container element. In some examples, this includes inserting an HTML iframe as a child node of the secure container element. When an iframe is used, the origin of any web content displayed in the iframe can be unique for a given web browser session. The origin can be owned by the extension component 112 and unreachable by the web application 108. For example, the web browser 104 can be configured to implement a same-origin policy that prevents untrusted web applications, such as the web application 108, from accessing the subdocument. In some examples, the extension component 112 configures the subdocument with CSS properties that match the CSS properties of the secure element. This may cause the subdocument, when rendered, to match its surroundings.

In some examples, the subdocument is arranged with CSS styles retrieved from the secure element. When the document is rendered, the subdocument may be rendered at the user interface UI 106. Utilizing CSS styles from the secure element may cause the document, including the portion rendered from the subdocument, to appear consistent. The subdocument can also be arranged with security properties to lessen the likelihood of a successful attack on the clear data. For example, the subdocument may be arranged to prevent HTTP content from outside the origin of the web browser 104 from being loaded into the subdocument. The subdocument can also be arranged such that no HTTP or other network requests are permitted to be created from within the subdocument. This can be accomplished, for example, by setting a strict content security policy (CSP). In some examples, the CSP is configured as a blank white list. In some examples, the subdocument is also arranged to prevent script or other web application execution in the subdocument, other than script owned by the extension component.

At operation 414, the extension component 112 determines if the secure element included an encrypted value. For example, the DIV-type secure element of Listing 1 is a display element and included an encrypted value. This may not always be the case. For example, an input element may not include an encrypted value, at least initially. If the secure element included an encrypted value, the extension component 112 decrypts the encrypted value and stores the encrypted value and the resulting clear value. The decryption can use a key from the key store 114 indicated by a key ID of the secure element and an algorithm indicated by the algorithm attribute. If no key ID and/or algorithm attribute is present, the extension component 112 can use a default key or algorithm. The extension component 112 can write the clear value resulting from the decryption to the subdocument. In some examples, the extension component 112 also writes the encrypted value to a property of the secure container element, where it can be accessed later as described herein.

Upon executing operation 416, or upon determining at operation 414 that there is no encrypted value, the extension component 112 can modify the DOM API properties of the secure container element and/or subdocument at operation 418. The modifications made at operation 418 can cause the secure container element and subdocument to behave differently based on the other component with which it interacts. For example, as described herein, when the web application 108 requests a value of the secure container element, the DOM API settings may cause the DOM API 134 to return to the web application 108 the encrypted value retrieved from the property of the secure container element. When the rendering engine 110 requests a value of the secure container element, the DOM API settings may cause the DOM API 134 to return the clear value from the subdocument.

Also, in some examples, if the secure container element corresponds to an input-type element, the extension component 112 configures the subdocument to generate a message when the clear value is updated, for example, through the web browser UI 106. The message is directed the extension component 112, permitting the extension component to update the secure container element as described herein.

Figure 5:
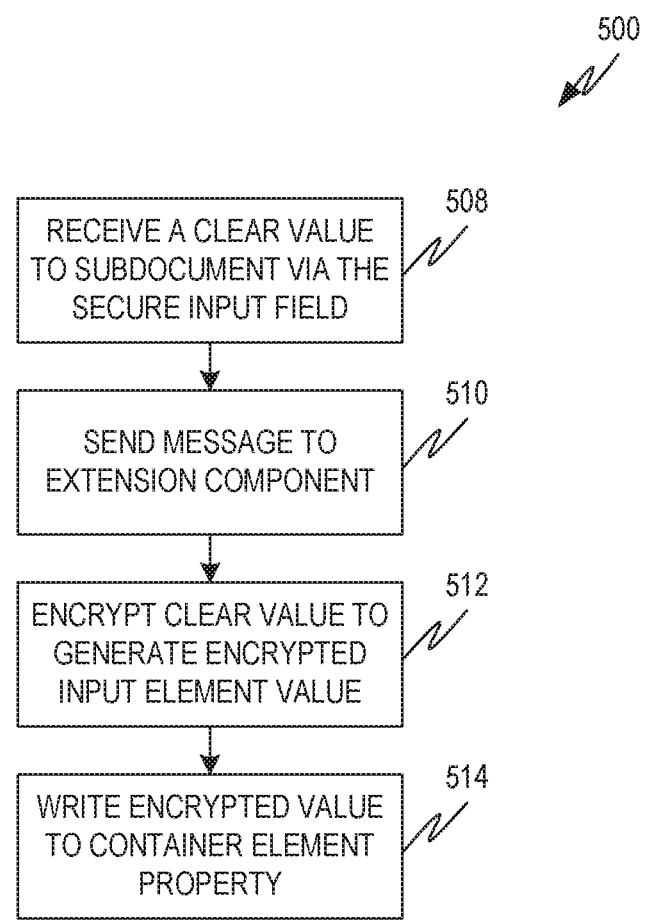
FIG. 5 is a flowchart showing one example of a process flow that can be executed by the web browser for updating an element upon receiving data via the web browser user interface.

FIG. 5 is a flowchart showing one example of a process flow 500 that can be executed by the web browser for updating an element upon receiving data via the web browser user interface 106. At operation 508, the web browser 104, via the web browser UI 106, receives a clear value from a user of the client computing device. For example, when the rendering engine 110 renders a secure container element that is an input-type element, the rendering engine 110 renders a secure input field described by the subdocument. The user can enter clear data into the subdocument via the secure input field.

At operation 510, the subdocument responds to the clear data by sending a message to the extension component. The message indicates that new clear data has been received. The extension component, at operation 512, encrypts the clear data from the subdocument to generate an encrypted value. The extension component can encrypt the clear data, for example, utilizing the cryptographic key and cryptographic algorithm indicated by the key ID and algorithm attribute of the secure container element. If no key ID or algorithm attribute is present, a default cryptographic key and/or algorithm is used. At operation 514, the extension component writes the encrypted value to the property of the secure container element.

The secure input field, as described herein, is implemented and described by the subdocument. In some examples, the secure input field is arranged in a way that is distinct from other input fields rendered with the document. Examples are shown herein at FIGS. 6-8.

Figure 6:
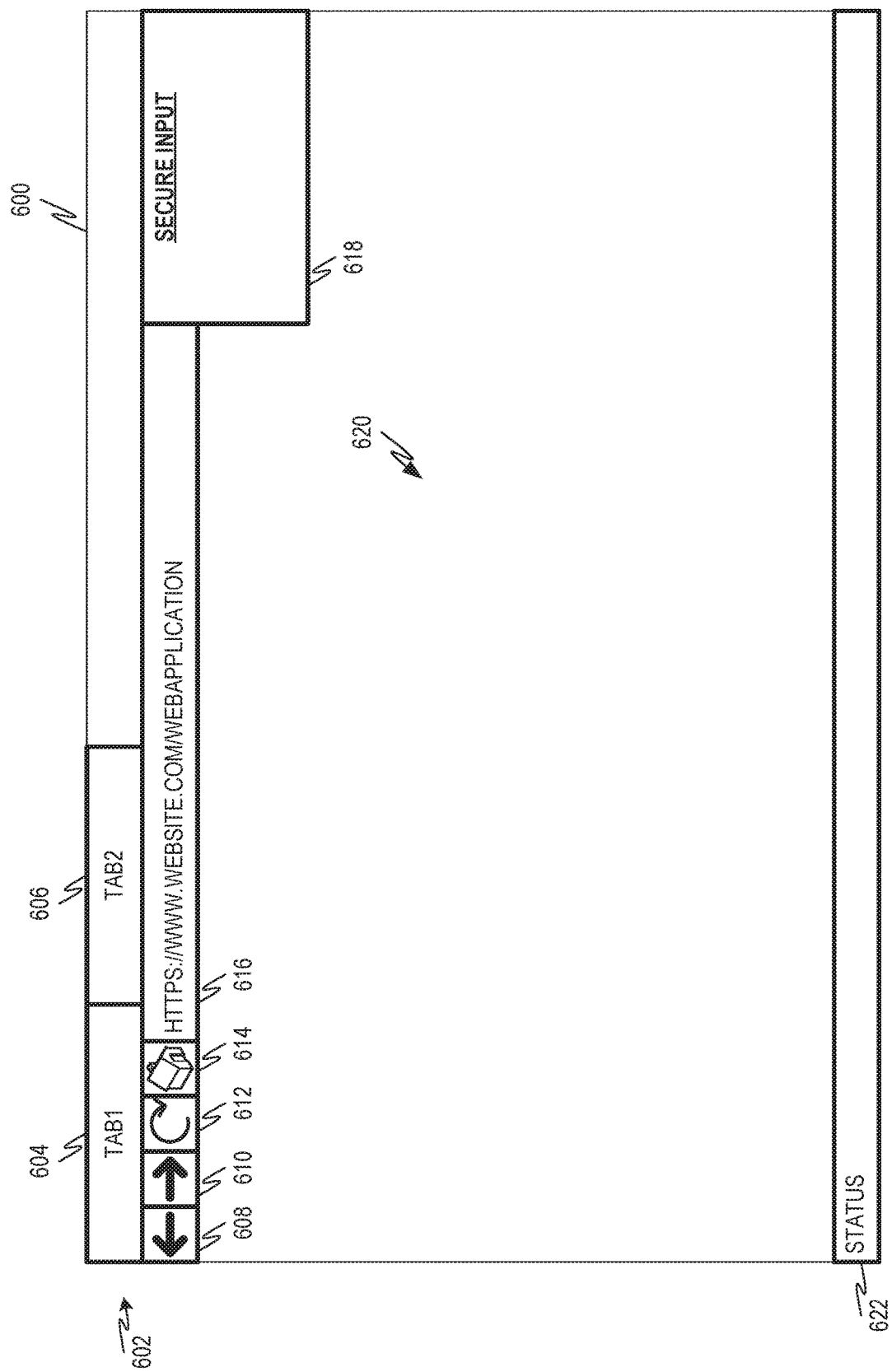
FIG. 6 is a diagram showing one example of a screen of the web browser UI demonstrating a secure input field.

FIG. 6 is a diagram showing one example of a screen 600 of the web browser UI 106 demonstrating a secure input field 618. The screen includes a main viewing panel 620 in which the document generated by the web application 108 is rendered. The screen also includes various other features of the web browser UI 106 including, for example, a tab bar 602 including tabs 604, 606. Each tab 604, 606, when selected, can cause the web browser 104 to display a different main viewing panel 620, for example, rendering a different document. Navigation buttons 608, 610, 612, 614 can be selected by the user to navigate between rendered documents. An address bar 616 can receive a URL or other address from the user for directing the web browser 104 to a web server, such as the web application provider 122. A status bar 622 is also shown.

In the example of FIG. 6, the secure input field 618 is separate from the main viewing panel 620 and contiguous with another element of the web browser UI 106. For example, as shown in FIG. 6, the secure input field 618 is contiguous with the address bar 616. In other arrangements, the secure input field 618 can be contiguous with other UI components of the web browser UI 106 such as, for example, navigation buttons 608, 610, 612, 614, status bar 622, tab bar 602, etc. In some examples, the secure input field 618 can also have features similar to those of other web browser UI components with which it is contiguous such common colors, shadings, font, etc. In some examples, the secure input field 618 can be positioned over the main viewing panel 620 in a manner that is not contiguous with any other web browser UI components. In such an arrangement, the secure input field 618 can have features similar to those of the other web browser UI component to distinguish it from the rendered document in the mail viewing panel.

Figure 7:
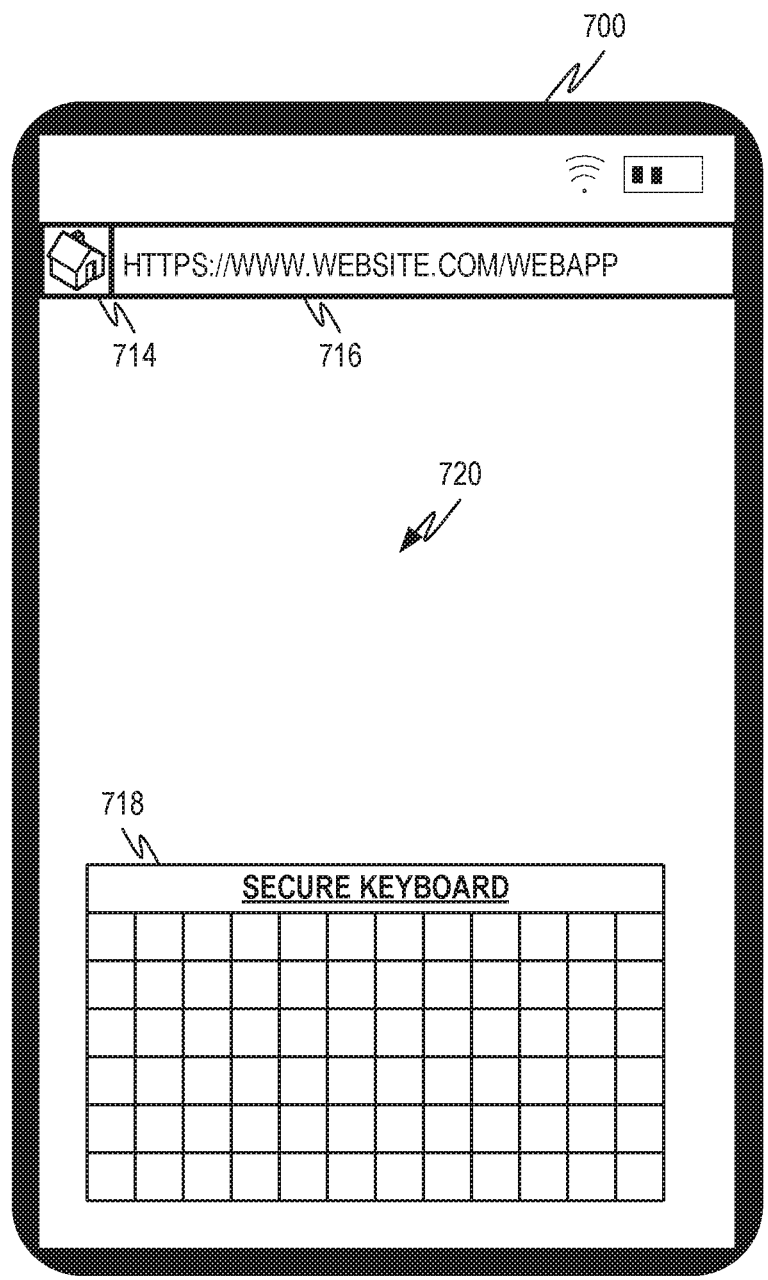
FIG. 7 is a diagram showing one example of a screen of the web browser UI with a secure keyboard.

FIG. 7 is a diagram showing one example of a screen 700 of the web browser UI 106 with a secure keyboard. The screen 700 may be displayed, for example, when the client computing device 102 is a mobile device having a touchscreen display. The screen 700 comprises a main viewing panel 720 and navigation components including a home button 714 and an address bar 716. The secure input field comprises a secure keyboard 718. A user can use the secure keyboard 718 to enter a clear value that can be utilized, for example, as described with respect to the process flow 300.

Figure 8:
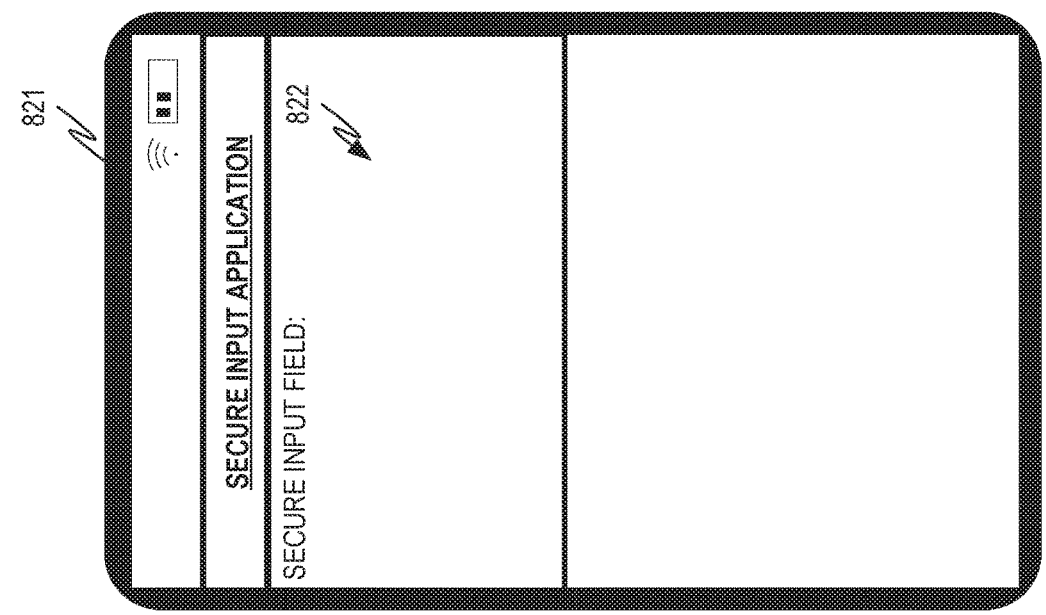
FIG. 8 is a diagram showing another example of a screen illustrating the launch of an additional input application including a secure input field.
Figure 8:
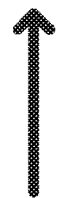
Figure 8:
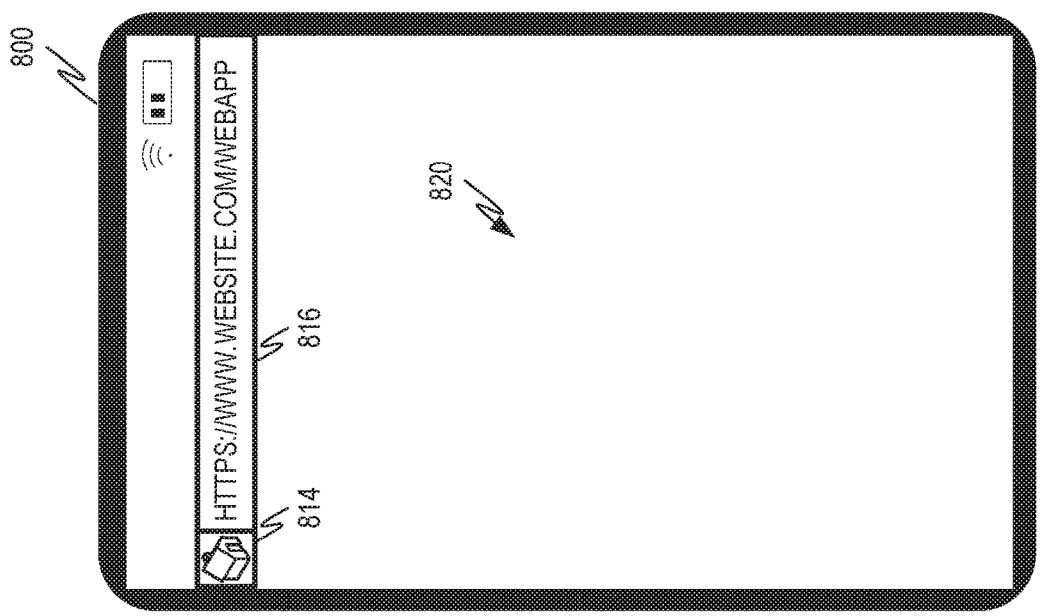

FIG. 8 is a diagram showing another example of a screen 800 illustrating the launch of an additional input application including a secure input field 822. The screen 800 is from an example web browser UI 106 and includes a main viewing panel 820, an address bar 816, and a home button 814. When the web browser 104 is to generate a secure input field, it man launch a secure input application. An example of a. UI screen 821 from a secure input application is also shown. The UI screen 821 may include text, colors, or other formatting indicating that it is for secure input. The example in FIG. 8 shows a secure input field 822.

Figure 9:
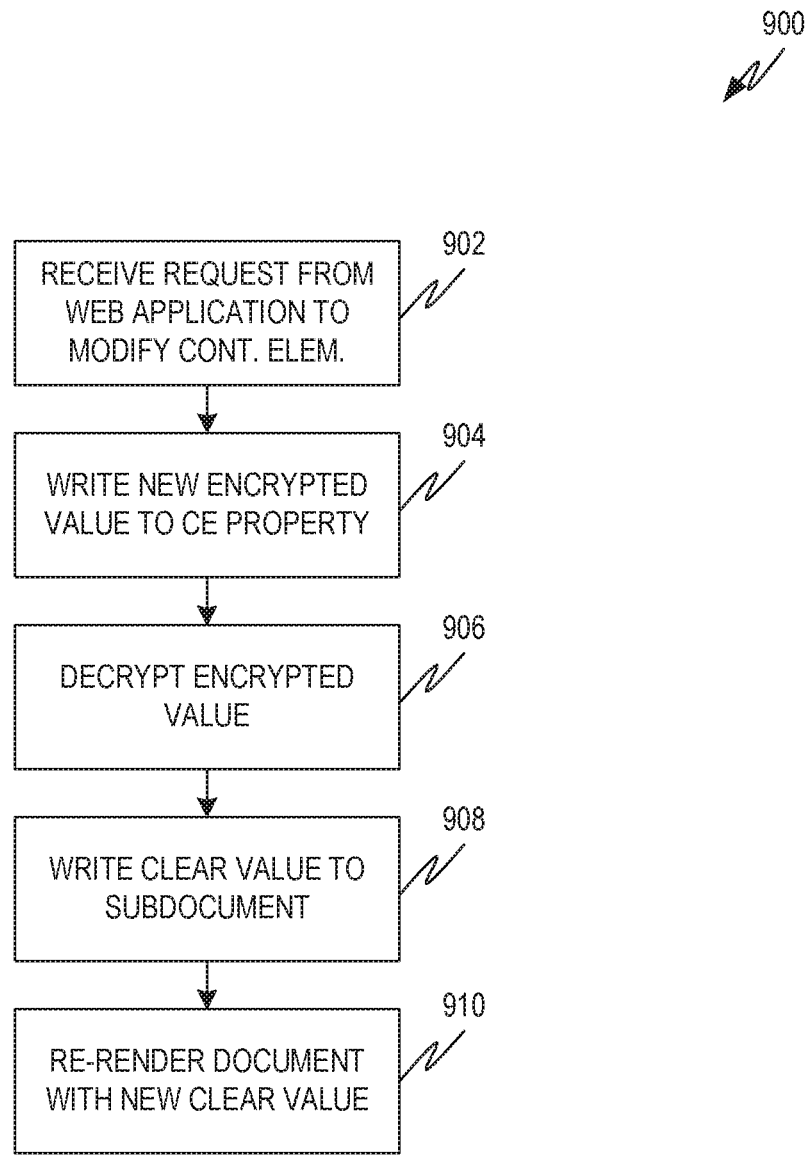
FIG. 9 is a flowchart showing one example of a process flow that can be executed by the web browser to respond to a request to modify a secure container element.

FIG. 9 is a flowchart showing one example of a process flow 900 that can be executed by the web browser 104 to respond to a request to modify a secure container element. At operation 902, the web application 108 requests to modify a value of the secure container element. The request includes a new encrypted value. The request is directed to the secure container element via the DOM API 134 and handled in accordance API properties set by the extension component 112 as described herein. For example, at operation 904, the DOM API 134 writes the new encrypted value to the property of the secure container element that stored the previous encrypted value.

At operation 906, the extension component 112 is called to decrypt the new encrypted value to generate a new clear value. The decryption can be performed utilizing the cryptographic key and algorithm indicated by the key ID and algorithm attribute indicated by the secure container element or using a default cryptographic key and algorithm. At operation 908, the extension component 112 writes the new clear value to the subdocument. In some examples, the new clear value replaces a previous clear value. At operation 910 the rendering engine 110 can re-render the document displaying the new clear value.

Figure 10:
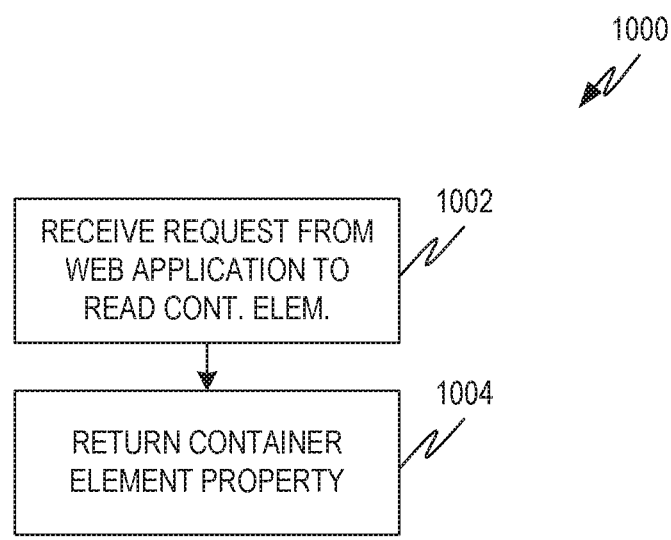
FIG. 10 is a flowchart showing one example of a process flow that can be executed by the web browser to respond to a request for a value of the secure container element.

FIG. 10 is a flowchart showing one example of a process flow 1000 that can be executed by the web browser 104 to respond to a request for a value of the secure container element. At operation 1002, the web browser 104 (e.g., the DOM API 134 thereof) receives a request from the web application 108 to read a value of a secure container element. The DOM API 134 generates a response in accordance with the API properties of the secure container element and/or subdocument set by the extension component 112 as described herein. For example, the DOM API 134 can, at operation 1004, return the encrypted value from the property location of the secure container element.

Example 1 is a system for executing a web application with client-side encryption, the system comprising: a client computing device comprising at least one hardware processor programmed to execute a web browser; and an output device, wherein the client computing device is also programmed to perform operations comprising: receiving a document with the web browser, the document comprising a plurality of data elements including a secure element that comprises an encrypted value; generating, by an extension component of the web browser, a secure container element to replace the secure element; inserting, by the extension component, a subdocument into the secure container element, wherein the web browser is configured to prevent web applications from accessing the subdocument; decrypting the encrypted value, by the extension component, to generate a clear value; writing the clear value to the subdocument; and rendering the document, by a rendering engine, using the clear value.

In Example 2, the subject matter of Example 1 optionally includes wherein the operations further comprise: writing, by the extension component, the encrypted value to a first property of the secure container element; requesting, by a web application executing in the web browser, a request to read the secure element; and returning, by the web browser and to the web application, the encrypted value from the first property In Example 3, the subject matter of any one or more of Examples 1-2 optionally includes wherein the operations further comprise: writing, by the extension component, the encrypted value to a first property of the secure container element; and modifying, by the extension component, a document object model (DOM) application program interface (API) policy associated with the secure container element to return the encrypted value from the first property in response to a request to read the secure container element.

In Example 4, the subject matter of any one or more of Examples 1-3 optionally includes wherein the operations further comprise: requesting*, by the web application, to write a new encrypted value to the secure container element; decrypting, by the extension component, the new encrypted value to generate a new clear value; and writing, by the extension component, the new clear value to the subdocument.

In Example 5, the subject matter of any one or more of Examples 1-4 optionally includes wherein the operations further comprise: writing, by the extension component, the encrypted value to a first property of the secure container element; and modifying, by the extension component, a DOM API policy associated with the secure container element to respond to a request to write a value to the secure container element by writing the value to the first property.

In Example 6, the subject matter of any one or more of Examples 1-5 optionally includes wherein the secure element is an input-type element, wherein the operations further comprise: displaying a secure input field associated with the subdocument; receiving a new clear value via the secure input field; generating a message to extension component indicating that the new clear value has been received; retrieving, by the extension component, the new clear value from the subdocument; and encrypting, by the extension component, the new clear value to generate a new encrypted value.

In Example 7, the subject matter of any one or more of Examples 1-6 optionally includes wherein the operations further comprise calling, by the extension component, a first service worker configured to call the extension component upon receiving the document.

In Example 8; the subject matter of any one or more of Examples 1-7 optionally includes wherein the secure element further comprises an indication of a cryptographic key stored at a key store of the extension component, and wherein the decrypting is based at least in part on the cryptographic key.

In Example 9, the subject matter of any one or more of Examples 1-8 optionally includes wherein the secure element further comprises an indication of a cryptographic algorithm, and wherein the decrypting comprises executing the cryptographic algorithm.

In Example 10, the subject matter of any one or more of Examples 1-9 optionally includes wherein the operations further comprise: before generating the secure container element, rendering the document, by the rendering engine, to generate a first document rendering; and writing the secure container element to the first document rendering.

Example 11 is a method for executing a web application with client-side encryption, the method comprising: receiving a document with a web browser at a client computing device, the document comprising a plurality of data elements including a secure element that comprises an encrypted value; generating, by an extension component associated with the web browser, a secure container element to replace the secure element; inserting, by the extension component, a subdocument into the secure container element, wherein the web browser is configured to prevent web applications from accessing the subdocument; decrypting the encrypted value, by the extension component, to generate a clear value; writing the clear value to the subdocument; and rendering the document, by a rendering engine, using the clear value.

In Example 12, the subject matter of Example 11 optionally includes writing, by the extension component, the encrypted value to a first property of the secure container element; requesting, by a web application executing in the web browser, a request to read the secure element; and returning, by the web browser and to the web application, the encrypted value from the first property.

In Example 13, the subject matter of any one or more of Examples 11-12 optionally includes writing, by the extension component, the encrypted value to a first property of the secure container element; and modifying, by the extension component, a document object model (DOM) application program interface (API) policy associated with the secure container element to return the encrypted value from the first property in response to a request to read the secure container element.

In Example 14, the subject matter of any one or more of Examples 11-13 optionally includes requesting, by the web application, to write a new encrypted value to the secure container element; decrypting, by the extension component, the new encrypted value to generate a new clear value; and writing, by the extension component, the new clear value to the subdocument.

In Example 15, the subject matter of any one or more of Examples 11-14 optionally includes writing, by the extension component, the encrypted value to a first property of the secure container element; and modifying, by the extension component, a. DOM API policy associated with the secure container element to respond to a request to write a value to the secure container element by writing the value to the first property.

In Example 16, the subject matter of any one or more of Examples 11-15 optionally includes wherein the secure element is an input-type element, further comprising: displaying a secure input field associated with the subdocument; receiving a new clear value via the secure input field; generating a message to extension component indicating that the new clear value has been received; retrieving, by the extension component, the new clear value from the subdocument; and encrypting, by the extension component, the new clear value to generate a new encrypted value.

In Example 17, the subject matter of any one or more of Examples 11-16 optionally includes calling, by the extension component, a first service worker configured to call the extension component upon receiving the document.

In Example 18, the subject matter of any one or more of Examples 11-17 optionally includes wherein the secure element further comprises an indication of a cryptographic key stored at a key store of the extension component, and wherein the decrypting is based at least in part on the cryptographic key.

In Example 19, the subject matter of any one or more of Examples 11-18 optionally includes wherein the secure element further comprises an indication of a cryptographic algorithm, and wherein the decrypting comprises executing the cryptographic algorithm.

Example 20 is a non-transitory machine-readable medium comprising instructions thereon that, when executed by at least one hardware processor, cause at least one hardware processor to perform operations comprising: receiving a document with a web browser executed by the at least one hardware processor, the document comprising a plurality of data elements including a secure element that comprises an encrypted value; generating, by an extension component associated with the web browser, a secure container element to replace the secure element; inserting, by the extension component, a subdocument into the secure container element, wherein the web browser is configured to prevent web applications from accessing the subdocument; decrypting the encrypted value, by the extension component, to generate a clear value; writing the clear value to the subdocument; and rendering the document, by a rendering engine, using the clear value.

Figure 11:
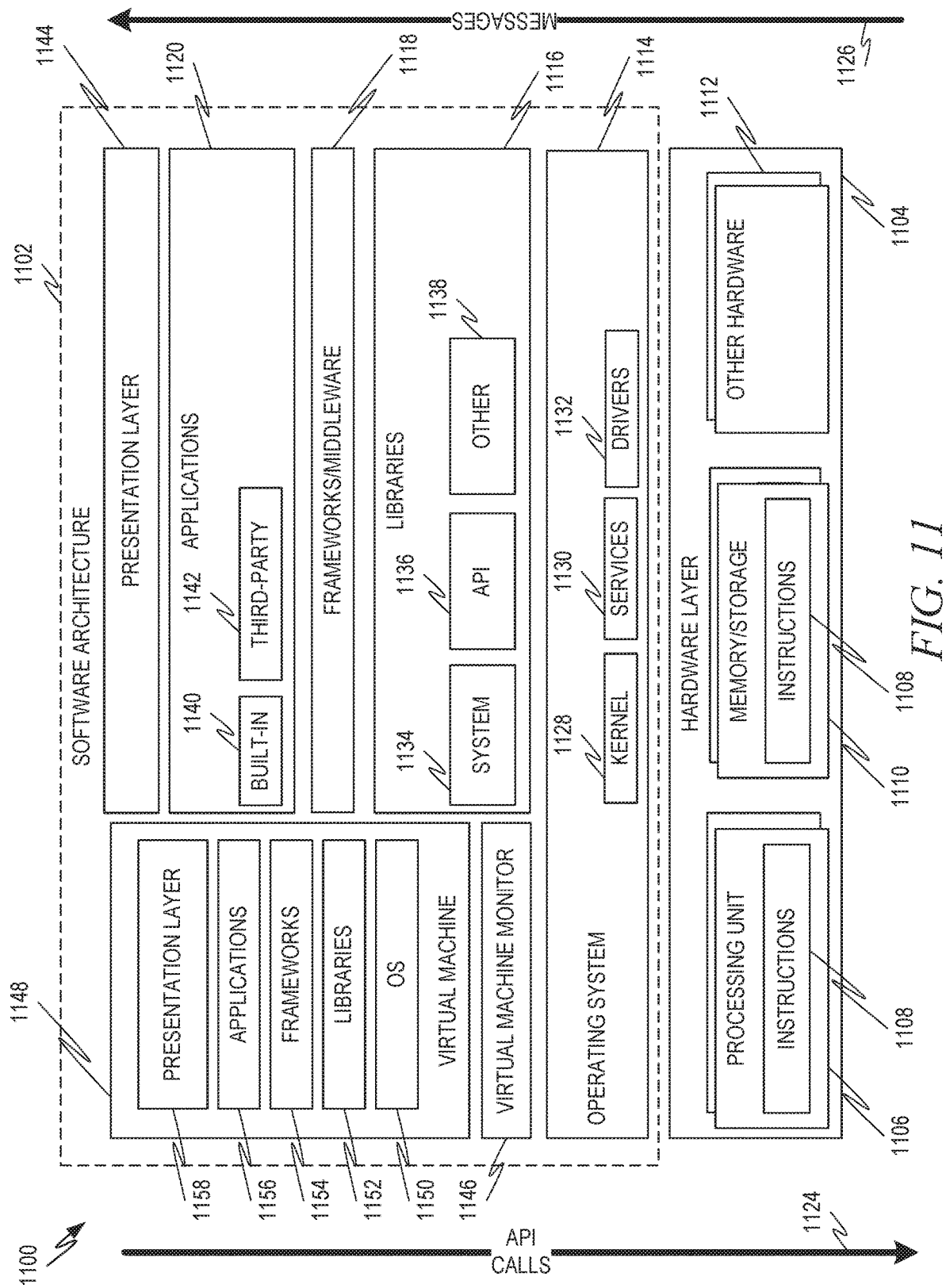
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112, which represents any other hardware of the hardware layer 1104, such as the other hardware illustrated as part of computer system 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 14D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules. In some examples, libraries 1116 may provide one or more APIs serviced by a message-oriented middleware.

The frameworks 1118 (also sometimes referred to as middleware; may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™ Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine 1148 is hosted by a host operating system (operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines, in some example embodiments, the processor or processors may be located in a single location e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs)

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 12:
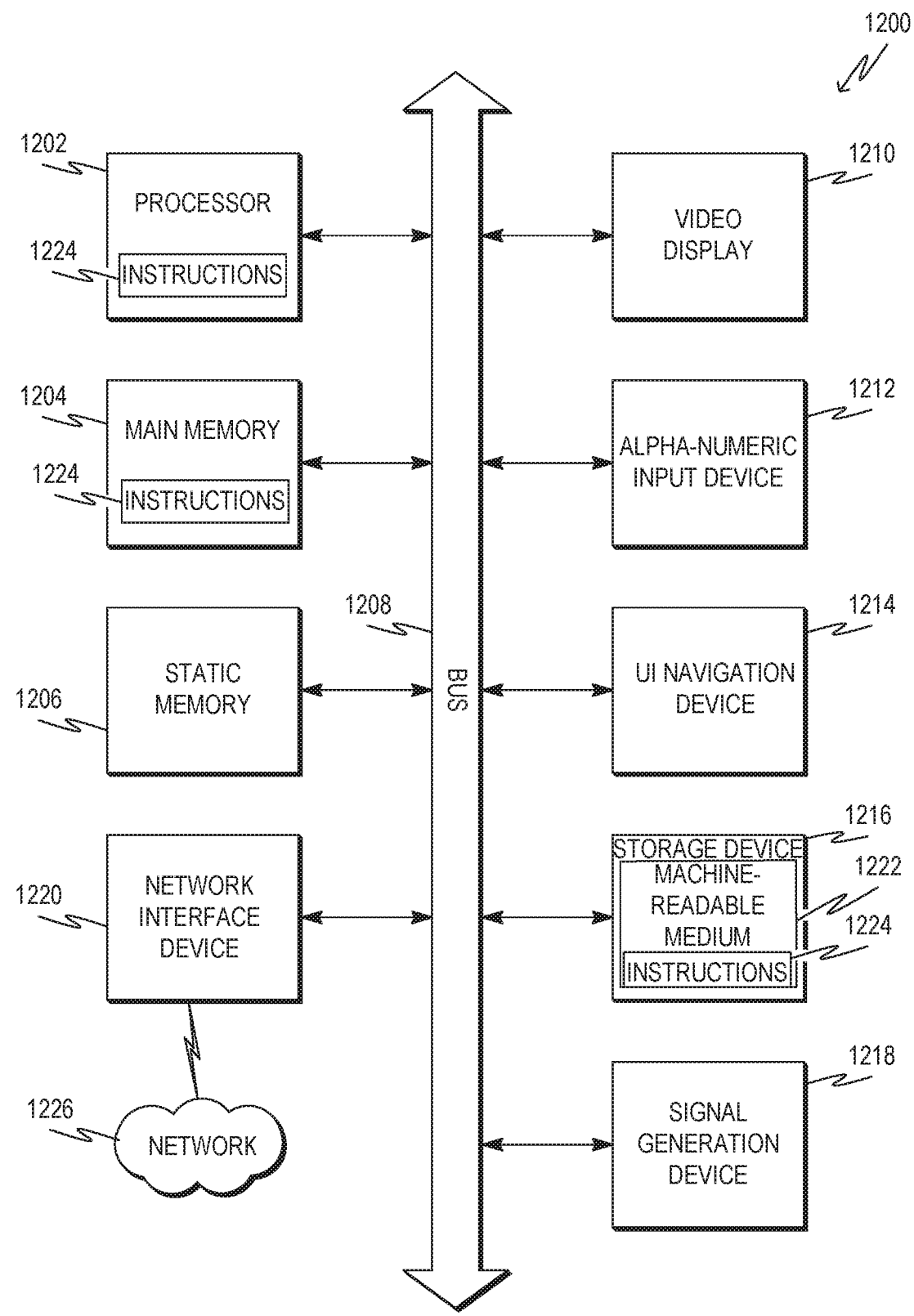
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1250 (e.g., a liquid crystal display (LCD) or a cathode ray tube (CRT)). The computer system 1200 also includes an alphanumeric input device 1252 (e.g., a keyboard or a touch-sensitive display screen), a user interface (UI) navigation (or cursor control) device 1254 (e.g., a mouse), a disk drive device 1256, a signal generation device 1258 (e.g., a speaker), and a network interface device 1220.

Machine-Readable Medium

The disk drive unit 1256 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices: magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, plain old telephone (POTS) networks; and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for executing a web application with client-side encryption, the system comprising:
    a client computing device comprising at least one hardware processor programmed to execute a web browser; and an output device, wherein the client computing device is also programmed to perform operations comprising:
        receiving a document with the web browser, the document comprising a plurality of data elements including a secure element that comprises an encrypted value;
        generating, by an extension component of the web browser, a secure container element to replace the secure element;
        inserting, by the extension component, a subdocument into the secure container element, wherein the web browser is configured to prevent web applications from accessing the subdocument;
        decrypting the encrypted value, by the extension component, to generate a clear value;
        writing the clear value to the subdocument;
        rendering the document, by a rendering engine, using the clear value;
        requesting, by the web application, to write a new encrypted value to the secure container element;
        decrypting, by the extension component, the new encrypted value to generate a new clear value;
        writing, by the extension component, the new clear value to the subdocument; and
        rendering a new document, by the rendering engine, using the new clear value.

2. The system of claim 1, wherein the operations further comprise:
    writing, by the extension component, the encrypted value to a first property of the secure container element;
    requesting, by a web application executing in the web browser, a request to read the secure element; and
    returning, by the web browser and to the web application, the encrypted value from the first property.

3. The system of claim 1, wherein the operations further comprise:
    writing, by the extension component, the encrypted value to a first property of the secure container element; and
    modifying, by the extension component, a document object model (DOM) application program interface (API) policy associated with the secure container element to return the encrypted value from the first property in response to a request to read the secure container element.

4. The system of claim 1, wherein the operations further comprise:
    writing, by the extension component, the encrypted value to a first property of the secure container element; and
    modifying, by the extension component, a DOM API policy associated with the secure container element to respond to a request to write a value to the secure container element by writing the value to the first property.

5. The system of claim 1, wherein the secure element is an input-type element, wherein the operations further comprise:
    displaying a secure input field associated with the subdocument;
    receiving a new clear value via the secure input field;
    generating a message to extension component indicating that the new clear value has been received;
    retrieving, by the extension component, the new clear value from the subdocument; and
    encrypting, by the extension component, the new clear value to generate a new encrypted value.

6. The system of claim 1, wherein the operations further comprise calling, by the extension component, a first service worker configured to call the extension component upon receiving the document.

7. The system of claim 1, wherein the secure element further comprises an indication of a cryptographic key stored at a key store of the extension component, and wherein the decrypting is based at least in part on the cryptographic key.

8. The system of claim 1, wherein the secure element further comprises an indication of a cryptographic algorithm, and wherein the decrypting comprises executing the cryptographic algorithm.

9. The system of claim 1, wherein the operations further comprise:
    before generating the secure container element, rendering the document, by the rendering engine, to generate a first document rendering; and
    writing the secure container element to the first document rendering.

10. A method for executing a web application with client-side encryption, the method comprising:
    receiving a document with a web browser at a client computing device, the document comprising a plurality of data elements including a secure element that comprises an encrypted value;
    generating, by an extension component associated with the web browser, a secure container element to replace the secure element;
    inserting, by the extension component, a subdocument into the secure container element, wherein the web browser is configured to prevent web applications from accessing the subdocument;
    decrypting the encrypted value, by the extension component, to generate a clear value;

writing the clear value to the subdocument;
rendering the document, by a rendering engine, using the clear value;
requesting, by the web application, to write a new encrypted value to the secure container element;
decrypting, by the extension component, the new encrypted value to generate a new clear value;
writing, by the extension component, the new clear value to the subdocument; and
rendering a new document, by the rendering engine, using the new clear value.

11. The method of claim 10, further comprising:
writing, by the extension component, the encrypted value to a first property of the secure container element;
requesting, by a web application executing in the web browser, a request to read the secure element; and
returning, by the web browser and to the web application, the encrypted value from the first property.

12. The method of claim 10, further comprising:
writing, by the extension component, the encrypted value to a first property of the secure container element; and
modifying, by the extension component, a document object model (DOM) application program interface (API) policy associated with the secure container element to return the encrypted value from the first property in response to a request to read the secure container element.

13. The method of claim 10, further comprising:
writing, by the extension component, the encrypted value to a first property of the secure container element; and
modifying, by the extension component, a DOM API policy associated with the secure container element to respond to a request to write a value to the secure container element by writing the value to the first property.

14. The method of claim 10, wherein the secure element is an input-type element, further comprising:
displaying a secure input field associated with the subdocument;
receiving a new clear value via the secure input field;
generating a message to extension component indicating that the new clear value has been received;
retrieving, by the extension component, the new clear value from the subdocument; and
encrypting, by the extension component, the new clear value to generate a new encrypted value.

15. The method of claim 10, further comprising calling, by the extension component, a first service worker configured to call the extension component upon receiving the document.

16. The method of claim 10, wherein the secure element further comprises an indication of a cryptographic key stored at a key store of the extension component, and wherein the decrypting is based at least in part on the cryptographic key.

17. The method of claim 10, wherein the secure element further comprises an indication of a cryptographic algorithm, and wherein the decrypting comprises executing the cryptographic algorithm.

18. A non-transitory machine-readable medium comprising instructions thereon that, when executed by at least one hardware processor, cause at least one hardware processor to perform operations comprising:
receiving a document with a web browser executed by the at least one hardware processor, the document comprising a plurality of data elements including a secure element that comprises an encrypted value;
generating, by an extension component associated with the web browser, a secure container element to replace the secure element;
inserting, by the extension component, a subdocument into the secure container element, wherein the web browser is configured to prevent web applications from accessing the subdocument;
decrypting the encrypted value, by the extension component, to generate a clear value;
writing the clear value to the subdocument;
rendering the document, by a rendering engine, using the clear value;
requesting to write a new encrypted value to the secure container element;
decrypting, by the extension component, the new encrypted value to generate a new clear value;
writing, by the extension component, the new clear value to the subdocument; and
rendering a new document, by the rendering engine, using the new clear value.

19. The medium of claim 18, wherein the operations further comprise:
writing, by the extension component, the encrypted value to a first property of the secure container element;
requesting, by a web application executing in the web browser, a request to read the secure element; and
returning, by the web browser and to the web application, the encrypted value from the first property.

20. The medium of claim 18, wherein the operations further comprise:
writing, by the extension component, the encrypted value to a first property of the secure container element; and
modifying, by the extension component, a document object model (DOM) application program interface (API) policy associated with the secure container element to return the encrypted value from the first property in response to a request to read the secure container element.

* * * * *